(12) United States Patent  
Yoshida

(10) Patent No.: US 7,975,907 B2  
(45) Date of Patent: Jul. 12, 2011

(54) INFORMATION PROCESSING TERMINAL, IC CARD, PORTABLE COMMUNICATION DEVICE, WIRELESS COMMUNICATION METHOD, AND PROGRAM

(75) Inventor: Yuko Yoshida, Tokyo (JP)

(73) Assignee: Felica Networks, Inc., Tokyo (JP)

( * ) Notice: Subject to any disclaimer, the term of this patent is extended or adjusted under 35 U.S.C. 154(b) by 678 days.

(21) Appl. No.: 11/736,993

(22) Filed: Apr. 18, 2007

(65) Prior Publication Data

US 2007/0246546 A1    Oct. 25, 2007

(30) Foreign Application Priority Data

Apr. 20, 2006  (JP) ................................. 2006-116574

(51) Int. Cl.  
*G06F 17/00* (2006.01)  
*G06K 19/06* (2006.01)
(52) U.S. Cl. ........................................ 235/375; 235/492
(58) Field of Classification Search .................. 235/375, 235/493, 492; 332/174; 375/295; 340/2.4, 340/5.4, 5.41, 5.6, 5.61  
See application file for complete search history.

(56) References Cited

U.S. PATENT DOCUMENTS

| | | | |
|---|---|---|---|
| 6,198,361 B1 * | 3/2001 | Arisawa ........................ 332/115 |
| 6,636,146 B1 | 10/2003 | Wehoski | |
| 6,671,493 B2 | 12/2003 | Cernusca et al. | |
| 6,836,472 B2 * | 12/2004 | O'Toole et al. ............. 340/10.1 |
| 7,183,844 B2 * | 2/2007 | Klomsdorf et al. ........... 330/129 |

FOREIGN PATENT DOCUMENTS

| | | |
|---|---|---|
| JP | 10-233717 | 9/1998 |
| JP | 10-285087 | 10/1998 |
| JP | 11-355186 | 12/1999 |
| JP | 2001-502456 | 2/2001 |
| JP | 2001-222696 | 8/2001 |
| JP | 2002-078247 | 3/2002 |
| JP | 5-128319 | 5/2002 |
| JP | 2002-139302 | 5/2002 |
| JP | 2004-514223 | 5/2004 |
| WO | WO 2005/122418 A1 | 12/2005 |

\* cited by examiner

*Primary Examiner* — Thien M Le  
(74) *Attorney, Agent, or Firm* — Finnegan, Henderson, Farabow, Garrett & Dunner, L.L.P.

(57) ABSTRACT

An information processing terminal is disclosed that is allowed to carry out contactless data transmission or reception with a reading or writing device by use of a magnetic field. The information processing terminal includes a data transmitter or receiver, a signal processor, and a load modulator. The data transmitter or receiver is configured to generate an induced voltage from a magnetic field generated from the reading or writing device at the time of data reception, and send a transmission signal to the read/write reading or writing device at the time of data transmission. The signal processor is configured to generate a response signal based on the induced voltage. The load modulator controls a variable resistance based on the induced voltage and carries out load modulation relating to the transmission signal based on the response signal and the variable resistance.

20 Claims, 6 Drawing Sheets

INFORMATION PROCESSING TERMINAL, IC CARD, PORTABLE COMMUNICATION DEVICE, WIRELESS COMMUNICATION METHOD, AND PROGRAM

CROSS REFERENCES TO RELATED APPLICATIONS

The present invention contains subject matter related to Japanese Patent Application JP 2006-116574 filed with the Japan Patent Office on Apr. 20, 2006, the entire contents of which being Incorporated herein by reference.

BACKGROUND OF THE INVENTION

1. Field of the Invention

The present invention relates to an information processing terminal, IC card, portable communication device, wireless communication method, and program.

2. Description of the Related Art

In recent years, contactless information processing terminals that can communicate with a read/write device (referred to as "reader/writer", hereinafter) through wireless communication, such as contactless integrated circuit (IC) cards and radio frequency identification (RFID) tags, have been widely distributed.

Contactless IC cards and RFID tags do not have a power supply in these media themselves but employ an induced voltage as the driving power supply thereof. The induced voltage refers to a voltage that is generated depending on magnetic flux when a magnetic field arising due to flowing of a current through a transmission coil as a transmission/reception antenna included in a reader/writer passes through a reception coil as a transmission/reception antenna included in the contactless IC cards and RFID tags. That is, the contactless IC cards and RFID tags receive through the reception coil the energy of the magnetic field transmitted from the transmission coil of the reader/writer, to thereby acquire the power necessary for driving thereof.

Furthermore, the contactless IC cards and RFID tags enable/disable a load included therein to thereby vary the impedance seen from the reader/writer. This impedance variation for the reader/writer through the enabling/disabling of the load is referred to as load modulation.

The load modulation in the contactless IC card or RFID tag varies the current that flows through the transmission coil in the reader/writer. The reader/writer detects the change of the current flowing through its transmission coil, varied due to the load modulation of the contactless IC card or RFID tag. The reader/writer regards this current change as response from the contactless IC card or RFID tag, and operates depending on the response.

In general, as the distance between the reader/writer and the contactless IC card or RFID tag becomes larger, the intensity of the magnetic field received by the reception coil of the contactless IC card or RFID tag from the reader/writer becomes smaller, and the induced voltage also becomes lower.

Furthermore, a magnetic field with a specific frequency (referred to as "carrier", hereinafter), such as a frequency of 13.56 MHz, is utilized for the communication between the contactless IC card or RFID tag and the reader/writer. The contactless IC cards and RFID tags include a resonant circuit designed to resonate at the specific frequency. However, if an impeder such as another contactless IC card exists between the reader/writer and the contactless IC card or RFID tag, the resonant frequency is changed, which lowers the induced voltage.

For example, Japanese Patent Laid-open No. 2001-222696 and No. Hei 10-233717 disclose a technique for stabilizing communication between an information processing terminal such as a contactless IC card or RFID tag and a reader/writer even when the distance between the information processing terminal and the reader/writer is changed or the resonant frequency of the information processing terminal is changed.

However, in some cases, the load modulation would be possibly executed when the energy of a magnetic field acquired by the information processing terminal from the reader/writer is low, i.e., when the magnitude of power acquired by the information processing terminal from the magnetic field is small, such as when the Induced voltage is originally low or when resonance is not caused at the specific frequency used as the frequency of the carrier and thus the induced voltage is lowered. In these cases, the information processing terminal would possibly become inoperative due to failure in acquisition of the power necessary for driving of the information processing terminal because of power consumption of a load such as a resistor relating to the load modulation. This would possibly lead not only to failure in the communication between the reader/writer and the information processing terminal but also to other various problems, such as corruption of data relating to the communication and recognition of unexpected data by the reader/writer.

Problems in an existing information processing terminal will be described below based on FIG. 6. FIG. 6 is an explanatory diagram showing a circuit relating to load modulation in the existing information processing terminal.

Referring to FIG. 6, the circuit relating to load modulation in the existing information processing terminal is formed of a resistor Rf having a specific resistance R and an N-channel metal oxide semiconductor (MOS) (referred to as "NMOS transistor", hereinafter) Tr2. The NMOS transistor Tr2 serves as a switch that is turned ON/OFF based on a response signal S5 that is a binary signal indicating a high or low level. An induced voltage V1 is applied to one end of the circuit. When the NMOS transistor Tr2 is ON, i.e., when the response signal S5 is at the high level, the other end of the circuit is connected to the ground GND, so that a current I4 flows through the circuit based on the induced voltage V1 and the resistance R of the resistor Rf. In contrast, when the NMOS transistor Tr2 is OFF, i.e., when the response signal S5 is at the low level, the circuit is open, and hence the current I4 does not flow through the circuit. The current I4 that flows through the circuit is expressed as $I4=V1/R$, and the power P3 consumed by the circuit is expressed as $P3=R(I4)^2=(V1)^2/R$.

As the resistance R of the resistor Rf becomes lower, the current I4 that flows through the resistor Rf when the response signal S5 is at the high level becomes larger, and the power consumption P3 also becomes higher. When the current I4 is large, a variation in the impedance of the existing information processing terminal seen from a reader/writer is also large, which has an advantageous effect on signal transmission from the existing information processing terminal to the reader/writer. However, the power consumption P3 is also high at this time. Therefore, if the induced voltage V1 is low, there is a possibility that the existing information processing terminal cannot be driven normally due to failure in securing of the power necessary for driving of the existing information processing terminal. When the information processing terminal is an IC card in particular, the terminal does not have a power supply in the terminal itself in many cases. Therefore, the failure in securing of the power necessary for the driving would lead to a serious problem.

In contrast, if the resistance R of the resistor Rf is increased, the current I4 that flows through the resistor Rf and the power consumption P3 can be decreased. In this case, the possibility of the occurrence of the failure in securing of the power necessary for driving of the existing information processing terminal is low. However, the variation in the impedance of the existing information processing terminal seen from the reader/writer is small irrespective of the magnitude of the induced voltage V1, which has a disadvantageous effect on signal transmission from the existing information processing terminal to the reader/writer.

SUMMARY OF THE INVENTION

There is a need for the present invention to provide a novel and improved information processing terminal, IC card, portable communication device, wireless communication method, and program that each can realize communication with a reader/writer surely even when the energy of a magnetic field from the reader/writer is low.

According to a first embodiment of the present invention, there is provided an information processing terminal that is allowed to carry out contactless data transmission/reception with a read/write device by use of a magnetic field. The information processing terminal includes a data transmitter/receiver configured to generate an induced voltage from a magnetic field generated from the read/write device at the time of data reception, and sends a transmission signal to the read/write device at the time of data transmission. The information processing terminal further includes a signal processor configured to generate a response signal based on the induced voltage, and a load modulator configured to include a load of which value is changed based on the induced voltage and carry out load modulation relating to the transmission signal based on the response signal.

According to this configuration, at the time of data reception, the data transmitter/receiver receives a magnetic field generated from the read/write device and generates an induced voltage through electromagnetic induction. Furthermore, at the time of data transmission, the data transmitter/receiver sends a transmission signal to the read/write device through load modulation based on the induced voltage. The signal processor is fed with the induced voltage and generates a response signal based on the induced voltage. The load modulator includes a load of which value is changed based on the induced voltage. Specifically, the load value is increased when the induced voltage is low, while the load value is decreased when the induced voltage is high for example. The change of the load value based on the induced voltage allows adjustment of the power consumed by the load. In addition, the load modulator enables/disables the load based on the response signal to thereby carry out the load modulation.

The load modulator may include a resistance variable circuit that has a variable resistance and serves as the load, a load variation level control circuit that changes the resistance of the resistance variable circuit based on the induced voltage, and a connection circuit that allows the load modulation based on the response signal.

According to this configuration, the resistance of the resistance variable circuit is changed, so that the power consumed by the resistance variable circuit is adjusted. The load variation level control circuit changes the resistance of the resistance variable circuit based on the induced voltage, to thereby adjust the power consumed by the resistance variable circuit. The connection circuit connects/disconnects the resistance variable circuit based on the response signal, which allows the load modulation. Therefore, the load modulator can carry out load modulation in which the power consumed by the resistance variable circuit as the load is adjusted.

The information processing terminal may further include an internal power supply, and an internal supply voltage detector configured to detect an internal supply voltage output from the internal power supply and output an internal supply voltage signal dependent upon the internal supply voltage. In addition, the load modulator may include a resistance variable circuit that has a variable resistance and serves as the load, a load variation level control circuit that changes the resistance of the resistance variable circuit based on the induced voltage and the internal supply voltage signal, and a connection circuit that allows the load modulation based on the response signal.

According to this configuration, the internal power supply outputs an internal supply voltage, and thus allows the information processing terminal to be driven by the internal supply voltage. The internal supply voltage detector detects the value of the internal supply voltage and outputs an internal supply voltage signal dependent upon the internal supply voltage. Furthermore, the load modulator includes the resistance variable circuit, the load variation level control circuit, and the connection circuit. The resistance of the resistance variable circuit is changed, so that the power consumed by the resistance variable circuit is adjusted. The load variation level control circuit changes the resistance of the resistance variable circuit based on the induced voltage and the internal supply voltage signal, to thereby adjust the power consumed by the resistance variable circuit. For example, when the internal supply voltage signal is at a low level, the value of the load is changed based on the induced voltage so that the power consumed by the load may be decreased. Furthermore, when the internal supply voltage signal is at a high level, the internal supply voltage can be used for driving of the information processing terminal. Therefore, the load value is changed based on the induced voltage so that the power consumed by the load may be set higher than that when the internal supply voltage signal is at the low level. The connection circuit connects/disconnects the resistance variable circuit based on the response signal, which allows the load modulation. Therefore, the load modulator can carry out load modulation in which the power consumed by the resistance variable circuit as the load is adjusted based on the induced voltage and the internal supply voltage signal.

According to a second embodiment of the present invention, there is provided an IC card that is allowed to carry out contactless data transmission/reception with a read/write device by use of a magnetic field. The IC card includes a data transmitter/receiver configured to generate an induced voltage from a magnetic field generated from the read/write device at the time of data reception, and sends a transmission signal to the read/write device at the time of data transmission. The IC card further includes a signal processor configured to generate a response signal based on the induced voltage, and a load modulator configured to include a load of which value is changed based on the induced voltage and carry out load modulation relating to the transmission signal based on the response signal.

According to this configuration, at the time of data reception, the data transmitter/receiver receives a magnetic field generated from the read/write device and generates an induced voltage through electromagnetic induction. Furthermore, at the time of data transmission, the data transmitter/receiver sends a transmission signal to the read/write device through load modulation based on the induced voltage. The signal processor is fed with the induced voltage and generates a response signal based on the induced voltage. The load modulator includes a load of which value is changed based on the induced voltage. Specifically, the load value is increased when the induced voltage is low, while the load value is decreased when the induced voltage is high for example. The change of the load value based on the induced voltage allows adjustment of the power consumed by the load. In addition, the load modulator enables/disables the load based on the response signal to thereby carry out the load modulation.

The IC card may further Include an internal power supply, and an internal supply voltage detector configured to detect an internal supply voltage output from the internal power supply and output an internal supply voltage signal dependent upon the internal supply voltage. In addition, the load modulator may include a resistance variable circuit that has a variable resistance and serves as the load, a load variation level control circuit that changes the resistance of the resistance variable circuit based on the induced voltage and the internal supply voltage signal, and a connection circuit that allows the load modulation based on the response signal.

According to this configuration, the internal power supply outputs an internal supply voltage, and thus allows the IC card to be driven by the internal supply voltage. The internal supply voltage detector detects the value of the internal supply voltage and outputs an internal supply voltage signal dependent upon the internal supply voltage. Furthermore, the load modulator includes the resistance variable circuit, the load variation level control circuit, and the connection circuit. The resistance of the resistance variable circuit is changed, so that the power consumed by the resistance variable circuit is adjusted. The load variation level control circuit changes the resistance of the resistance variable circuit based on the induced voltage and the internal supply voltage signal, to thereby adjust the power consumed by the resistance variable circuit. For example, when the internal supply voltage signal is at a low level, the value of the load is changed based on the induced voltage so that the power consumed by the load may be decreased. Furthermore, when the internal supply voltage signal is at a high level, the internal supply voltage can be used for driving of the IC card. Therefore, the load value is changed based on the induced voltage so that the power consumed by the load may be set higher than that when the internal supply voltage signal is at the low level. The connection circuit connects/disconnects the resistance variable circuit based on the response signal, which allows the load modulation. Therefore, the load modulator can carry out load modulation in which the power consumed by the resistance variable circuit as the load is adjusted based on the induced voltage and the internal supply voltage signal.

According to a third embodiment of the present invention, there is provided a portable communication device that is allowed to carry out contactless data transmission/reception with a read/write device by use of a magnetic field. The portable communication device includes a data transmitter/receiver configured to generate an induced voltage from a magnetic field generated from the read/write device at the time of data reception, and sends a transmission signal to the read/write device at the time of data transmission. The portable communication device further includes a signal processor configured to generate a response signal based on the induced voltage, and a load modulator configured to include a load of which value is changed based on the induced voltage and carry out load modulation relating to the transmission signal based on the response signal.

According to this configuration, at the time of data reception, the data transmitter/receiver receives a magnetic field generated from the read/write device and generates an induced voltage through electromagnetic induction. Furthermore, at the time of data transmission, the data transmitter/receiver sends a transmission signal to the read/write device through load modulation based on the induced voltage. The signal processor is fed with the induced voltage and generates a response signal based on the induced voltage. The load modulator includes a load of which value is changed based on the induced voltage. Specifically, the load value is increased when the induced voltage is low, while the load value is decreased when the induced voltage is high for example. The change of the load value based on the induced voltage allows adjustment of the power consumed by the load. In addition, the load modulator enables/disables the load based on the response signal to thereby carry out the load modulation.

The portable communication device may further include an internal power supply, and an internal supply voltage detector configured to detect an internal supply voltage output from the internal power supply and output an internal supply voltage signal dependent upon the internal supply voltage. In addition, the load modulator may include a resistance variable circuit that has a variable resistance and serves as the load, a load variation level control circuit that changes the resistance of the resistance variable circuit based on the induced voltage and the internal supply voltage signal, and a connection circuit that allows the load modulation based on the response signal.

According to this configuration, the internal power supply outputs an internal supply voltage, and thus allows the portable communication device to be driven by the internal supply voltage. The internal supply voltage detector detects the value of the internal supply voltage and outputs an internal supply voltage signal dependent upon the internal supply voltage. Furthermore, the load modulator includes the resistance variable circuit, the load variation level control circuit, and the connection circuit. The resistance of the resistance variable circuit is changed, so that the power consumed by the resistance variable circuit is adjusted. The load variation level control circuit changes the resistance of the resistance variable circuit based on the induced voltage and the internal supply voltage signal, to thereby adjust the power consumed by the resistance variable circuit. For example, when the internal supply voltage signal is at a low level, the value of the load is changed based on the induced voltage so that the power consumed by the load may be decreased. Furthermore, when the internal supply voltage signals is at a high level, the internal supply voltage can be used for driving of the portable communication device. Therefore, the load value is changed based on the induced voltage so that the power consumed by the load may be set higher than that when the internal supply voltage signal is at the low level. The connection circuit connects/disconnects the resistance variable circuit based on the response signal, which allows the load modulation. Therefore, the load modulator can carry out load modulation in which the power consumed by the resistance variable circuit as the load is adjusted based on the induced voltage and the internal supply voltage signal.

According to a fourth embodiment of the present invention, there is provided a wireless communication method for contactless data transmission/reception with a read/write device by use of a magnetic field. The method includes the steps of generating an induced voltage from a magnetic field generated from the read/write device, changing the value of a load based on the induced voltage to thereby adjust power consumed by the load, and carrying out load modulation with use of the load to thereby allow communication with the read/write device.

According to this method, an induced voltage is generated from a magnetic field generated from the read/write device through electromagnetic induction, so that a signal transmitted from the read/write device is received. Furthermore, the value of the load is changed based on the induced voltage, which adjusts the power consumed by the load. In addition, load modulation is carried out by enabling/disabling the load of which load value is changed based on the induced voltage, so that a signal is transmitted to the read/write device. Therefore, the method allows communication with the read/write device in such a manner as to adjust the power consumed by the load.

According to a fifth embodiment of the present invention, there is provided a program that relates to wireless communication for contactless data transmission/reception with a read/write device by use of a magnetic field. The program causes a computer to function as an entity including a unit configured to generate an induced voltage from a magnetic field generated from the read/write device, a unit configured to change the value of a load based on the induced voltage to thereby adjust power consumed by the load, and a unit configured to carry out load modulation with use of the load to thereby allow communication with the read/write device.

According to this program, a computer is caused to function as an entity including a unit that generates an induced voltage from a magnetic field generated from a read/write device through electromagnetic induction to thereby receive a signal transmitted from the read/write device, a unit that changes the value of a load based on the induced voltage to thereby adjust the power consumed by the load, and a unit that carries out load modulation by enabling/disabling the load of which load value is changed based on the induced voltage, to thereby transmit a signal to the read/write device. Therefore, using this program allows the computer to function for wireless communication in which contactless data transmission/reception with the read/write device is carried out by use of a magnetic field.

According to the embodiments of the present invention, the value of a load relating to load modulation is changed depending on the magnitude of an induced voltage generated from a magnetic field, so that the power consumed by the load is adjusted. This allows communication with a reader/writer surely even when the energy of the magnetic field from the reader/writer is low.

DETAILED DESCRIPTION OF THE PREFERRED EMBODIMENTS

Embodiments of the present invention will be described in detail below with reference to the accompanying drawings. In the present specification and drawings, components having substantially the same function are given the same numerals, and overlapping description is omitted.

First Embodiment

Figure 1:
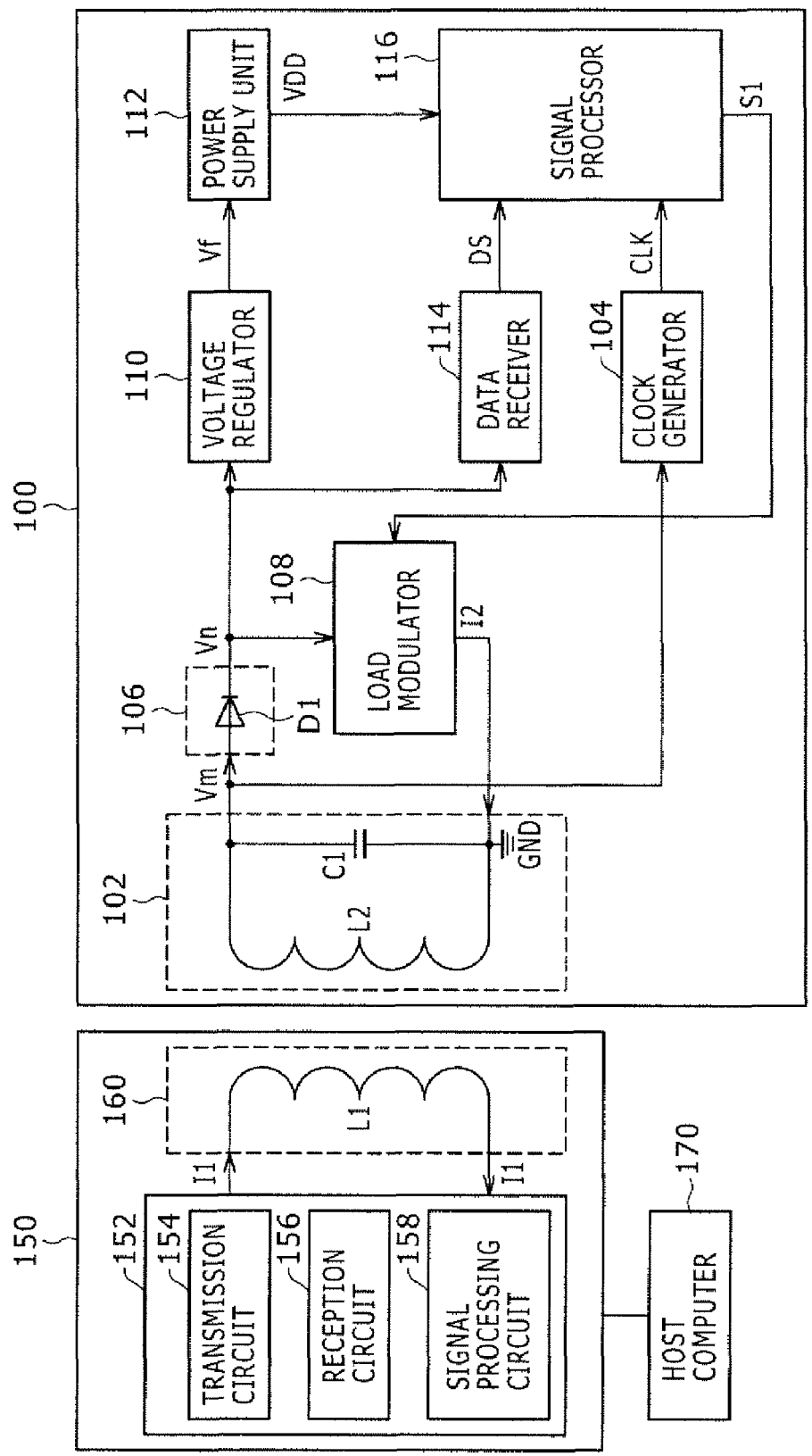
FIG. 1 is a block diagram showing a communication system formed of a read/write device and an information processing terminal according to a first embodiment of the present invention.

FIG. 1 is a block diagram showing a communication system formed of a reader/writer 150 and an information processing terminal 100 according to a first embodiment of the present invention.

Referring to FIG. 1, the reader/writer 150 includes a transmission coil L1 as a transmission/reception antenna 160 and a reader/writer driver 152, and is connected to a host computer 170. The reader/writer driver 152 includes a transmission circuit 154 that applies an AC current I1 to the transmission coil L1 for transmission of a carrier, a reception circuit 156 that receives the current I1 flowing through the transmission coil L1, and a signal processing circuit 158. The reader/writer 150 detects a change of the current I1. The reader/writer 150 regards the current change as response from the information processing terminal 100 according to the first embodiment, and operates in association with the host computer 170 depending on the response.

The information processing terminal 100 according to the first embodiment includes a data transmitter/receiver 102, a diode D1 as a detection circuit 106, a voltage regulator 110, a power supply unit 112, a clock generator 104, a DATA receiver 114, a signal processor 116, and a load modulator 108. The data transmitter/receiver 102 receives a carrier transmitted from the reader/writer 150, and generates an AC induced voltage Vm through electromagnetic induction. The diode D1 as the detection circuit 106 rectifies the induced voltage Vm to a DC induced voltage Vn, to thereby demodulate a signal included in the carrier transmitted from the reader/writer 150. The voltage regulator 110 smoothes the induced voltage Vn and converts the smoothed voltage into a constant voltage, to thereby output a voltage Vf. The power supply unit 112 is fed with the voltage Vf and outputs a drive voltage VDD for driving the information processing terminal 100. The clock generator 104 is driven by the drive voltage VDD and generates a rectangular clock signal CLK from the induced voltage Vm. The DATA receiver 114 is driven by the drive voltage VDD and amplifies the Induced voltage Vn to thereby output a binary data signal DS indicating a high or low level. The signal processor 116 is driven by the drive voltage VDD and outputs a binary response signal S1 indicating a high or low level based on the clock signal CLk and the data signal DS. The load modulator 108 carries out load modulation based on the response signal S1 and outputs a current I2. The data transmitter/receiver 102 is formed of a reception coil L2 that receives a carrier and a capacitor C1. The data transmitter/receiver 102 is a resonant circuit that has an end connected to the ground GND and is designed to resonate at a specific frequency. The load modulation in the load modulator 108 varies the impedance of the information processing terminal 100 seen from the reader/writer 150. This impedance variation can be regarded as signal transmission from the information processing terminal 100 to the reader/ writer 150. The information processing terminal 100 may include a computer (not shown) for controlling the above-described components. Alternatively, any of the above-described components may serve as a computer.

Figure 2:
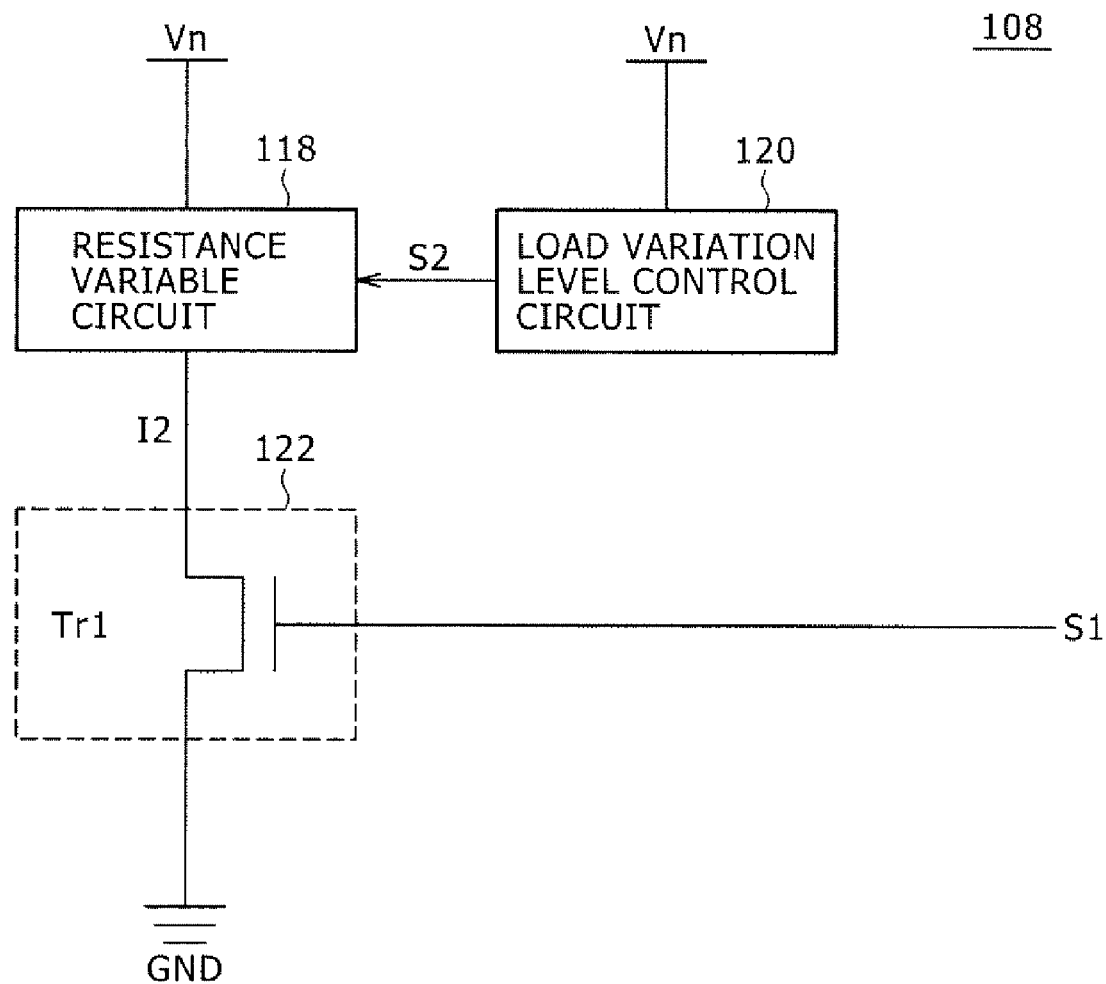
FIG. 2 is an explanatory diagram showing the detailed configuration of a load modulator in the information processing terminal according to the first embodiment.

FIG. 2 is an explanatory diagram showing the detailed configuration of the load modulator 108 in the information processing terminal 100 according to the first embodiment.

Referring to FIG. 2, the load modulator 108 includes a resistance variable circuit 118 of which resistance Rv1 can be changed, and a load variation level control circuit 120 that changes the resistance Rv1 of the resistance variable circuit 118. The load modulator 108 includes also an NMOS transistor Tr1 as a connection circuit 122 serving as a switch that is turned ON/OFF based on the response signal S1.

The load variation level control circuit 120 includes at least a voltage detector that detects the induced voltage Vn, and a resistance control signal output part that outputs a resistance control signal S2 dependent upon the induced voltage Vn detected by the detector. As the resistance control signal output part, e.g. a unit employing a table that shows the correspondence relationship between the induced voltage Vn and the resistance control signal S2 is available. However, the signal output part is not limited thereto as long as it can output the resistance control signal S2 based on the induced voltage Vn.

The resistance variable circuit 118 may be formed of a circuit that includes parallel-connected resistors each having a specific resistance and is switched based on the resistance control signal S2. Alternatively, the resistance variable circuit 118 may be formed of an element of which resistance can be changed based on the resistance control signal S2. It Is also possible to form the resistance variable circuit 118 by a capacitor and coil.

The NMOS transistor Tr1 as the connection circuit 122 connects the resistance variable circuit 118 to the ground GND when the response signal S1 is at the high level, and disconnects the resistance variable circuit 118 from the ground GND when the response signal S1 is at the low level. That is, the connection circuit 122 connects the resistance variable circuit 118 to the ground GND based on the response signal S1.

In FIG. 2, the load variation level control circuit 120 and the resistance variable circuit 118 are separated from each other. However, the configuration of these circuits is not limited thereto, but these circuits may be integrated with each other as a single circuit. In addition, the connection circuit 122 is not limited to an NMOS transistor but may be formed of a P-channel MOS transistor as long as the polarity of the response signal S1 is inverted prior to being applied to the connection circuit 122 for example. Alternatively, the connection circuit 122 may be formed of a single-pole single-throw (SPST) switch employing a PIN (p-intrinsic-n) diode.

The induced voltage Vn is applied to one end of the load modulator 108. When the NMOS transistor Tr1 is ON, i.e., when the response signal S1 is at the high level, the other end of the load modulator 108 is connected to the ground GND, so that the current I2 flows through the load modulator 108 based on the induced voltage Vn and the resistance Rv1 of the resistance variable circuit 118. In contrast, when the NMOS transistor Tr1 is OFF, i.e., when the response signal S1 is at the low level, the load modulator 108 is open, and hence the current I2 does not flow through the load modulator 108. The current I2 that flows through the load modulator 108 is expressed as $I2=Vn/Rv1$, and the power P1 consumed by the load modulator 108 is expressed as $P1=Rv1 \cdot (I2)^2=(Vn)^2/Rv1$. The resistance Rv1 of the resistance variable circuit 118 relating to load modulation is not a fixed value but a variable value. A description will be made below about advantageous effects offered by the feature that the resistance Rv1 of the resistance variable circuit 118 is variable.

Figure 3:
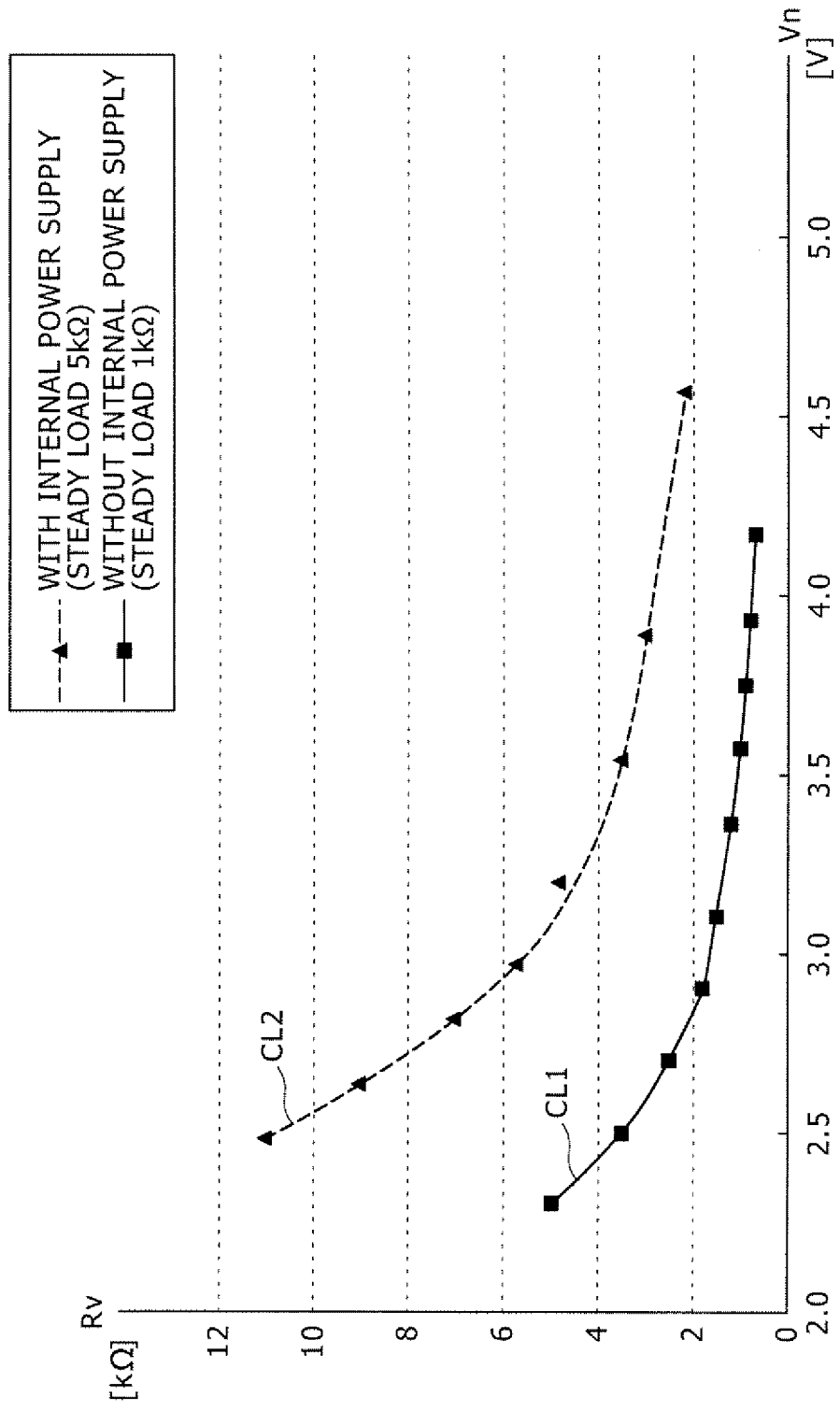
FIG. 3 is an explanatory diagram showing one example of the correspondence relationship between an induced voltage and the resistance of a load in information processing terminals according to the first embodiment and a second embodiment of the present invention.

FIG. 3 is an explanatory diagram showing one example of the correspondence relationship between the induced voltage Vn and the resistance Rv of a load in information processing terminals according to the first embodiment and a second embodiment of the present invention to be described later. In FIG. 3, the curve CL1 indicates the correspondence relationship between the induced voltage Vn and the resistance Rv of a load in the information processing terminal 100 according to the first embodiment. The curve CL2 indicates the correspondence relationship between the induced voltage Vn and the resistance Rv of a load in an information processing terminal 200 according to the second embodiment. The term "steady load" in FIG. 3 refers to the load other than the load relating to load modulation, and indicates the load that specifies the power consumed through use of the induced voltage Vn. The value of the steady load can be properly designed by a designer depending on the information processing terminal. The values on the curves CL1 and CL2 shown in FIG. 3 are merely one example and vary depending on the combination between the reader/writer 150 and the information processing terminal. Furthermore, in FIG. 3, the curve CL1 corresponds to a steady load of 1 [kΩ], while the curve CL2 corresponds to a steady load of 5 [kΩ]. Therefore, it is impossible to directly compare the curves CL1 and CL2 with each other because the steady load values thereof are different from each other. In the following, attention will be focused on the curve CL1 relating to the first embodiment. The curve CL2 of the second embodiment will be described later.

Referring to FIG. 3, the curve CL1 shows that the resistance Rv1 of the resistance variable circuit 118, as the resistance Rv of a load according to the first embodiment, varies depending on the induced voltage Vn. For example, when the induced voltage Vn is 2.50 [V], the resistance Rv1 of the resistance variable circuit 118 is 3.50 [kΩ] (this case will be referred to as "Pattern 1", hereinafter). Furthermore, when the induced voltage Vn is 3.75 [V], the resistance Rv1 of the resistance variable circuit 118 is 0.90 [kΩ] (this case will be referred to as "Pattern 2", hereinafter). The power P11 consumed by the resistance variable circuit 118 in Pattern 1 is $17.9 \times 10^{-4}$ (obtained through rounding of a raw-data value to five decimal places, the same hereinafter) [W]. The power P12 consumed by the resistance variable circuit 118 in Pattern 2 is $156.3 \times 10^{-4}$ [W]. Therefore, the power consumed by the resistance variable circuit 118 in Pattern 2 is higher than that in Pattern 1. That is, in the information processing terminal 100 according to the first embodiment, when the induced voltage Vn is lower, the power P1 consumed by the resistance variable circuit 118 is also set lower.

Figure 6:
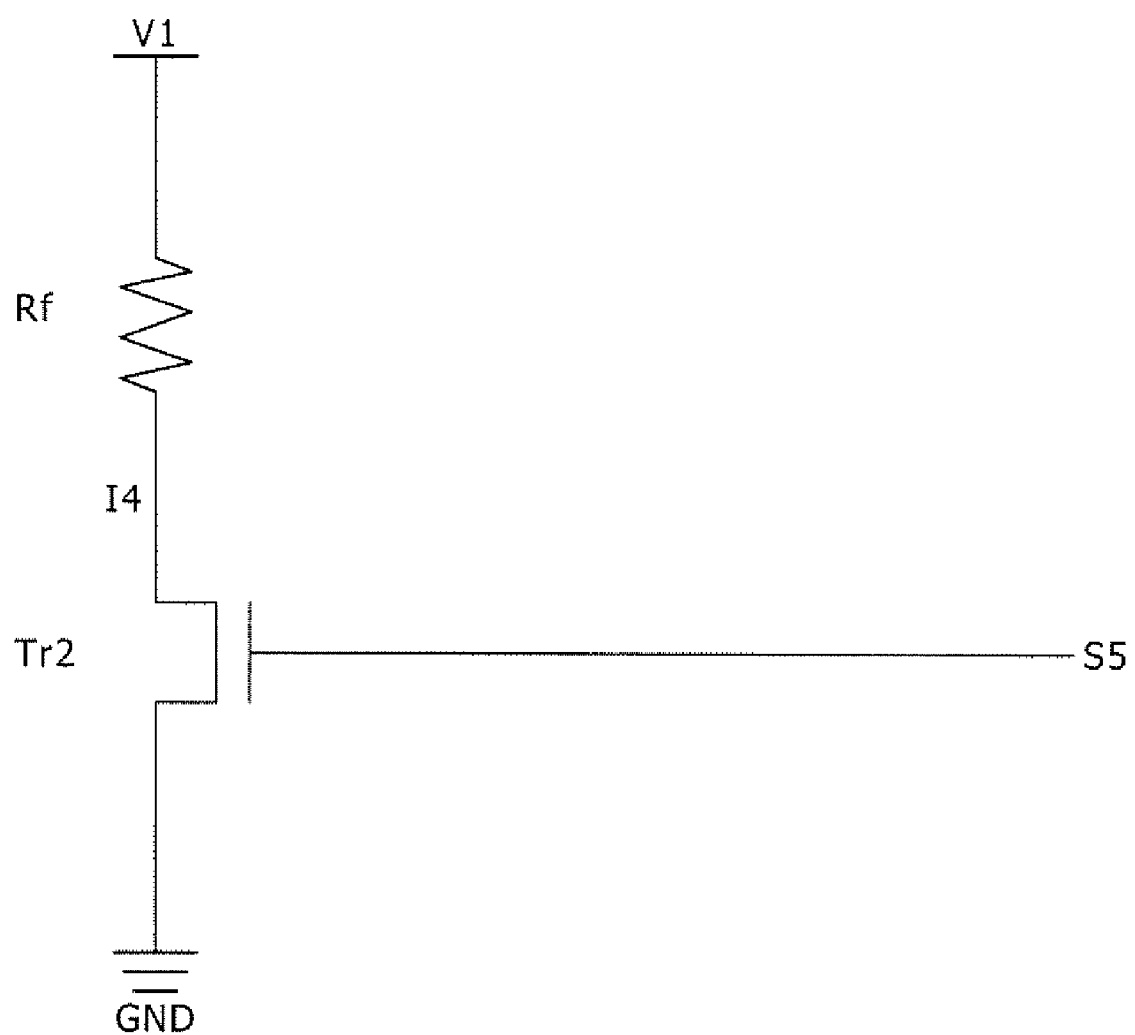
FIG. 6 is an explanatory diagram showing a circuit relating to load modulation in an existing information processing terminal.

If, for comparison, the resistance Rv1 of the resistance variable circuit 118 is fixed to 0.90 [kΩ] like in the circuit shown in FIG. 6, which relates to load modulation in an existing information processing terminal, when the induced voltage Vn is 2.50 [V] (this case will be referred to as "Pattern 3", hereinafter), the power P13 consumed by the resistance variable circuit 118 is $69.4 \times 10^{-4}$ [W]. Therefore, the power P1 consumed by the resistance variable circuit 118 in Pattern 3, equivalent to the power consumed by the circuit relating to load modulation in an existing information processing terminal, is higher than that in Pattern 1. Furthermore, when the induced voltage Vn is 3.75 [V] (this case will be referred to as "Pattern 4", hereinafter), the power P14 consumed by the resistance variable circuit 118 is $156.3 \times 10^{-4}$ [W]. Therefore, the power consumption in Pattern 4, equivalent to the power consumption of the circuit relating to load modulation in an existing information processing terminal, is the same as that in Pattern 2.

Therefore, when the induced voltage Vn is particularly low, the information processing terminal 100 according to the first embodiment can decrease the power P1 consumed by the resistance variable circuit 118 as the load relating to load modulation compared with an existing information processing terminal, and hence can ensure higher power necessary for driving of the information processing terminal 100 compared with in the existing information processing terminal. That is, compared with the existing information processing terminal, the information processing terminal 100 according to the first embodiment can greatly lower the possibility of the occurrence of various problems, such as failure in communication between the reader/writer 150 and the information processing terminal 100, corruption of data relating to the communication, and recognition of unexpected data by the reader/writer 150.

If, for another comparison, the resistance Rv1 of the resistance variable circuit 118 is fixed to 3.50 [kΩ] like in a circuit relating to load modulation in an existing information processing terminals when the induced voltage Vn is 250 [V] (this case will be referred to as "Pattern 5", hereinafter), the power P15 consumed by the resistance variable circuit 118 is $17.9 \times 10^{-4}$ [W]. Therefore, the power consumption in Pattern 5, equivalent to power consumption of a circuit relating to load modulation in an existing information processing terminal, is the same as that in Pattern 1. Furthermore, when the induced voltage Vn is 3.75 [V] (this case will be referred to as "Pattern 6", hereinafter), the power P16 consumed by the resistance variable circuit 118 is $40.2 \times 10^{-4}$ [W]. Therefore, the power P1 consumed by the resistance variable circuit 118 in Pattern 6, equivalent to the power consumed by a circuit relating to load modulation in an existing information processing terminal, is lower than that in Pattern 2. When the power P1 consumed by the resistance variable circuit 118 is low, the current I2 that flows through the resistance variable circuit 118 is small, which results in small variation in the impedance of the information processing terminal 100 seen from the reader/writer 150 between when the NMOS transistor Tr1 is ON and when it is OFF. The small impedance variation is disadvantageous in signal transmission from the information processing terminal 100 to the reader/writer 150.

However, when the induced voltage Vn is high, the information processing terminal 100 according to the first embodiment can increase the power consumption of the resistance variable circuit 118 as the load relating to load modulation compared with an existing information processing terminal, and hence can apply a larger current I2 to the data transmitter/receiver 102 Included in the information processing terminal 100 compared with in the existing information processing terminal. That is, the information processing terminal 100 is larger than the existing information processing terminal in variation in the impedance of the information processing terminal 100 seen from the reader/writer 150 between when the NMOS transistor Tr1 is ON and when it is OFF. Consequently, the information processing terminal 100 is advantageous over the existing information processing terminal in signal transmission to the reader/writer 150.

As described above, the information processing terminal 100 according to the first embodiment causes the load modulator 108 to change the resistance Rv1 of the resistance variable circuit 118 as a load based on the induced voltage Vn, to thereby adjust the power P1 consumed by the resistance variable circuit 118. Through the change of the load relating to load modulation, the information processing terminal 100 according to the first embodiment can offer the following advantages. Specifically, the information processing terminal 100 can greatly lower the possibility of the occurrence of various problems that may occur when the induced voltage Vn is low, such as failure in communication between the reader/writer 150 and the information processing terminal 100, corruption of data relating to the communication, and recognition of unexpected data by the reader/writer 150, compared with an existing information processing terminal. Furthermore, when the induced voltage Vn is high, the information processing terminal 100 according to the first embodiment can transmit a more intense data signal to the reader/writer 150 compared with an existing information processing terminal.

The information processing terminal 100 has been described above as an example of the first embodiment of the present invention. However, the first embodiment is not limited thereto but can be applied also to portable communication devices typified by IC cards, cell phones, and personal handyphone systems (PHSs), and other various devices such as RFID tags.

Second Embodiment

The information processing terminal 100 according to the first embodiment employs the induced voltage Vm as the only power supply thereof. However, it is also possible of course that the information processing terminal 100 includes an internal power supply. A description will be made below about the second embodiment of the present invention including an internal power supply.

Figure 4:
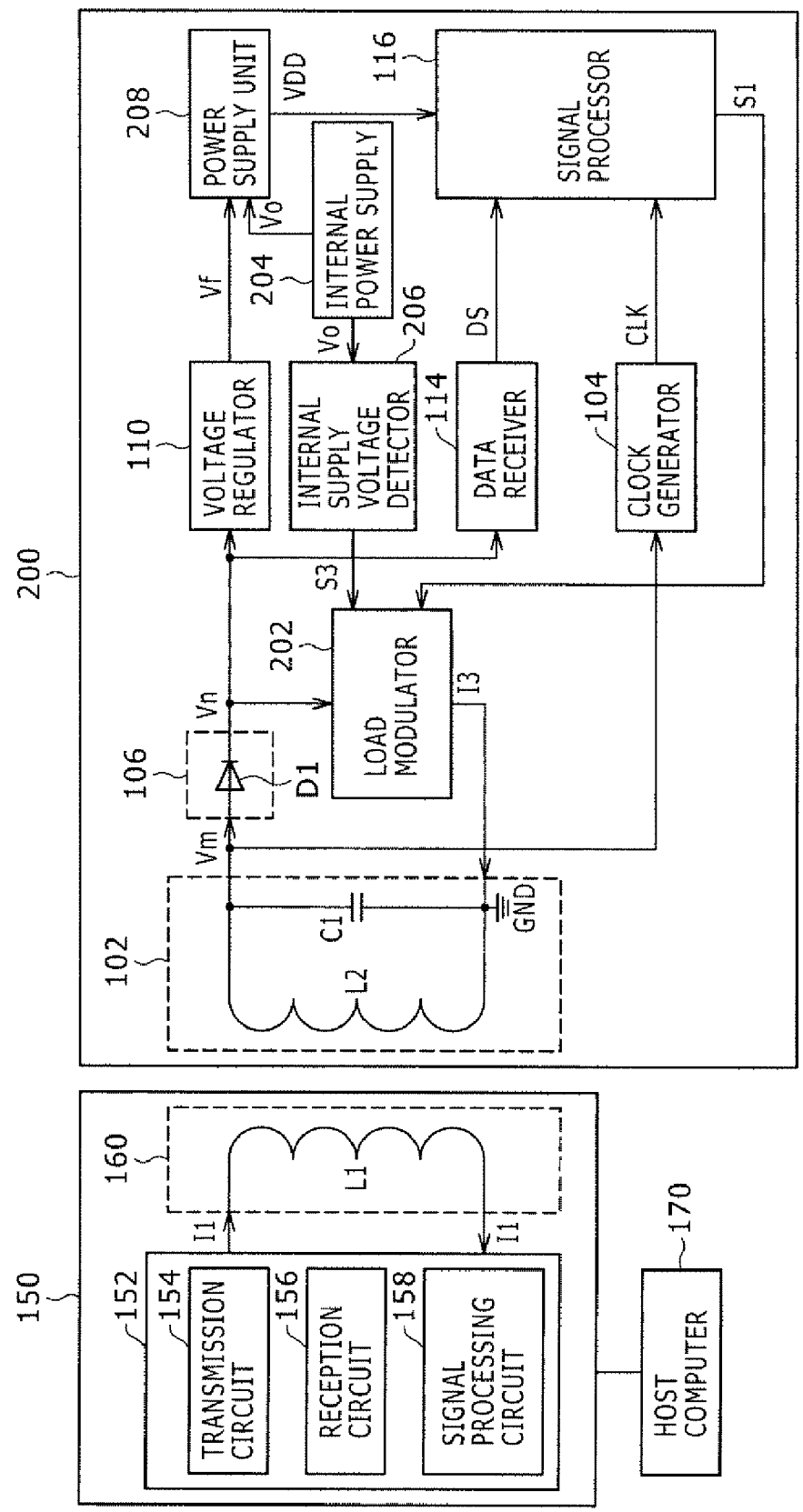
FIG. 4 is a block diagram showing a communication system formed of a read/write device and the information processing terminal according to the second embodiment.

FIG. 4 is a block diagram showing a communication system formed of a reader/writer 150 and the information processing terminal 200 according to the second embodiment.

The reader/writer 150 according to the second embodiment has the same configuration and function as those of the reader/writer 150 in the first embodiment. The information processing terminal 200 according to the second embodiment is different from the information processing terminal 100 according to the first embodiment shown in FIG. 1, In that the information processing terminal 200 includes an Internal power supply 204 such as a battery and an internal supply voltage detector 206 as additional components. In addition, due to this additional provision of the internal power supply 204 and the internal supply voltage detector 206, the configurations of a load modulator 202 and a power supply unit 208 in the second embodiment are different from those of the load modulator 108 and the power supply unit 112 in the first embodiment.

The internal power supply 204 outputs an internal supply voltage Vo to the power supply unit 208 and the internal supply voltage detector 206. The power supply unit 208 is fed with a voltage Vf output from a voltage regulator 110 and the internal supply voltage Vo and outputs a drive voltage VDD for driving the information processing terminal 200. The internal supply voltage detector 206 detects the value of the internal supply voltage Vo, and outputs a binary internal supply voltage signal S3 to the load modulator 202 depending on the detected internal supply voltage Vo. Specifically, the internal supply voltage detector 206 outputs the signal S3 at a high level when the internal supply voltage Vo is higher than a predetermined threshold, and outputs the signal S3 at a low level when it is lower than the threshold. The internal supply voltage detector 206 may output the binary internal supply voltage signal S3 based on the presence or absence of the internal supply voltage Vo. Alternatively, the internal supply voltage detector 206 may output the internal supply voltage signal S3 that can be varied at three or more plural stages depending on the value of the internal supply voltage Vo with use of a table showing the correspondence relationship between the value of the internal supply voltage Vo and the internal supply voltage signal S3. More alternatively, the internal supply voltage detector 206 may output the internal supply voltage signal S3 that can be continuously varied depending on the value of the internal supply voltage Vo.

Figure 5:
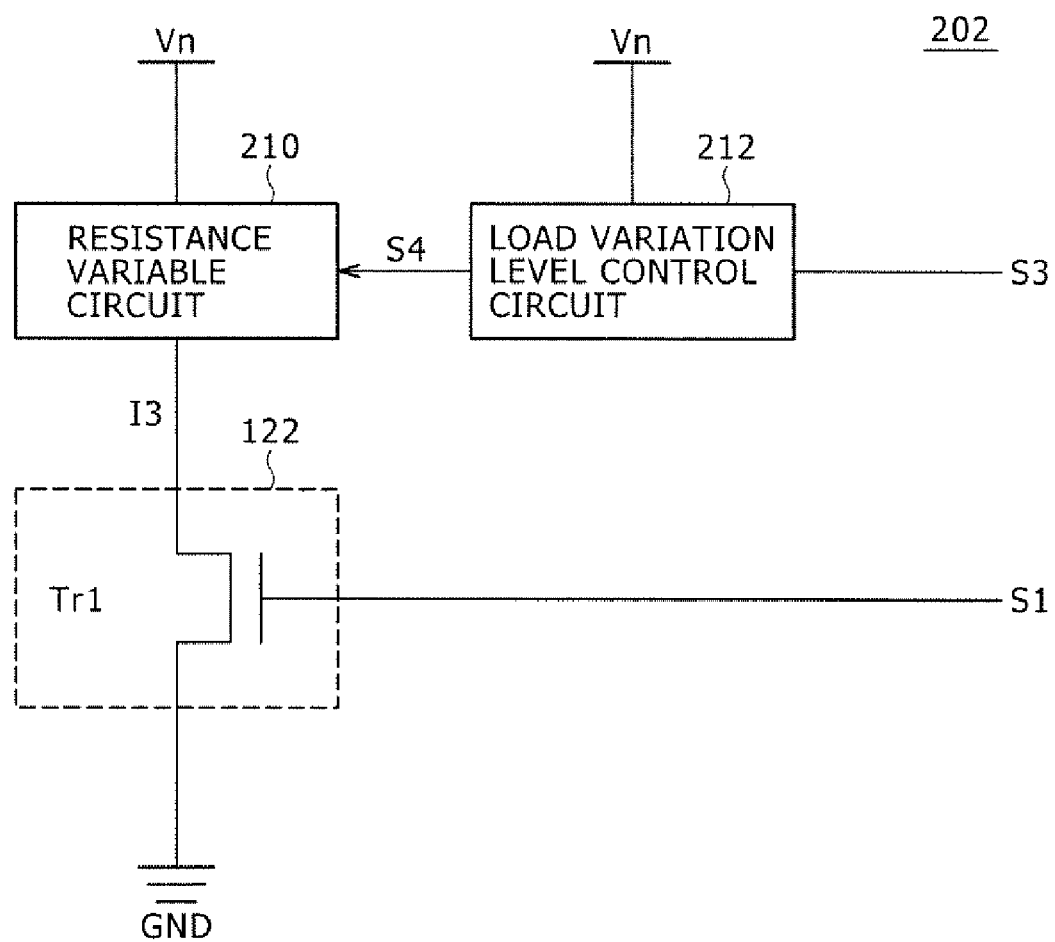
FIG. 5 is an explanatory diagram showing the detailed configuration of a load modulator in the information processing terminal according to the second embodiment.

FIG. 5 is an explanatory diagram showing the detailed configuration of the load modulator 202 in the information processing terminal 200 according to the second embodiment.

Referring to FIG. 5, the load modulator 202 includes a resistance variable circuit 210 of which resistance Rv2 can be changed, and a load variation level control circuit 212 that changes the resistance Rv2 of the resistance variable circuit 210. The load modulator 202 includes also an NMOS transistor Tr1 as a connection circuit 122 serving as a switch that is turned ON/OFF based on a response signal S1.

The load variation level control circuit 212 includes at least a voltage detector that detects the induced voltage Vn, and a resistance control signal output part that outputs a resistance control signal S4 dependent upon the induced voltage Vn detected by the detector and the internal supply voltage signal S3. As the resistance control signal output part, a unit is available that outputs the resistance control signal S4 by using either of two tables each showing the correspondence relationship between the induced voltage Vn and the resistance control signal S4 depending on the internal supply voltage signal S3. One of these two tables is used when the internal supply voltage signal S3 is at a low level, i.e., when the internal supply voltage Vo is lower than a certain threshold or zero. The other is used when the internal supply voltage Vo is higher than the threshold. Alternatively, the resistance control signal output part may output the resistance control signal S4 by using one table that shows the correspondence relationship among the internal supply voltage signal S3, the induced voltage Vn, and the resistance control signal S4. However, the output part is not limited to these configurations as long as it can output the resistance control signal S4 based on the internal supply voltage signal S3 and the induced voltage Vn.

The resistance variable circuit 210 may be formed of a circuit that includes parallel-connected resistors each having a specific resistance and is switched cased on the resistance control signal S4. Alternatively, the resistance variable circuit 118 may be formed of an element of which resistance can be changed based on the resistance control signal S4. It is also possible to form the resistance variable circuit 210 by a capacitor and coil. The resistance variable circuit 210 basically has the same configuration as that of the resistance variable circuit 118 according to the first embodiment. However, because the resistance variable circuit 210 is controlled by the resistance control signal S4 dependent upon the internal supply voltage signal S3 and the induced voltage Vn as described above, the variable range of the resistance Rv2 of the resistance variable circuit 210 can be set wider than that of the resistance Rv1 of the resistance variable circuit 118 according to the first embodiment.

In FIG. 5, the load variation level control circuit 212 and the resistance variable circuit 210 are separated from each other. However, the configuration of these circuits is not limited thereto, but these circuits may be integrated with each other as a single circuit.

With reference to FIG. 3, a description will be made below about advantageous effects offered by the feature that the resistance Rv2 of the resistance variable circuit 210 can be varied based on the internal supply voltage signal S3 and the induced voltage Vn. This description is based on an assumption that the internal supply voltage signal S3 is a signal indicating a high or low level for convenience of explanation. However, the internal supply voltage signal S3 may be a signal that takes any of values at three or more plural stages or continuously varies depending on the value of the internal supply voltage Vo.

When the internal power supply 204 is available, i.e., when the internal supply voltage signal S3 is at the high level, the internal supply voltage Vo can be used for driving of the information processing terminal 200. Therefore, the induced voltage Vn is used only for a part of the information processing terminal 200, and thus the power P2 consumed by the resistance variable circuit 210 can be increased compared with that in an information processing terminal that does not have the internal power supply 204, i.e., in the information processing terminal 100 according to the first embodiment.

This feature can be understood also from FIG. 3 as follows, although it is impossible to make a direct comparison between the curves CL1 and CL2 corresponding to the first and second embodiments, respectively, as described above. Specifically, when the respective values on the curve CL1 are multiplied by five to thereby make an assumed curve, i.e., when it is assumed that the steady load corresponding to the curve CL1 is 5 [kΩ], the resistance Rv of the load when the induced voltage Vn is 2.50 [V] is 17.5 [kΩ] according to the assumed curve, and hence the power P1 consumed by the load at this time is $3.6 \times 10^{-4}$ [W]. In contrast, according to the curve CL2, the resistance Rv2 of the resistance variable circuit 210 when the induced voltage Vn is 2.49 [V] is 11.0 [kΩ], and thus the power consumption P2 at this time is $5.6 \times 10^{-4}$ [W]. As is apparent also from this comparison, compared with the information processing terminal 100 according to the first embodiment, the information processing terminal 200 according to the second embodiment can offer larger variation in the impedance seen from the reader/writer 150 and thus can transmit a data signal more efficiently.

When the internal supply voltage signal S3 is at the low level, the information processing terminal 200 is equivalent to an information processing terminal that does not have the internal power supply 204, and hence provides the same advantageous effects as those by the information processing terminal 100 according to the first embodiment.

As described above, the information processing terminal 200 according to the second embodiment causes the load modulator 202 to change the resistance Rv2 of the resistance variable circuit 210 as a load based on the induced voltage Vn, to thereby adjust the power P2 consumed by the resistance variable circuit 210. The information processing terminal 200 according to the second embodiment includes the internal power supply 204 for outputting the internal supply voltage Vo, which allows acquisition of the power necessary for driving of the information processing terminal 200. Therefore, the information processing terminal 200 can provide higher power consumption of the load relating to load modulation compared with the information processing terminal 100 according to the first embodiment. Consequently, the information processing terminal 200 according to the second embodiment can offer larger variation in the impedance seen from the reader/writer 150 compared with the information processing terminal 100 according to the first embodiment, and thus can transmit a data signal more efficiently.

Furthermore, through the change of the load relating to load modulation, the information processing terminal 200 according to the second embodiment can offer the following advantages. Specifically, the information processing terminal 200 can greatly lower the possibility of the occurrence of various problems that may occur when the induced voltage Vn is particularly low, such as failure in communication between the reader/writer 150 and the information processing terminal 100, corruption of data relating to the communication, and recognition of unexpected data by the reader/writer 150, compared with an existing information processing terminal. Furthermore, when the induced voltage Vn is high, the information processing terminal 200 according to the second embodiment can offer larger variation in the impedance seen from the reader/writer 150 compared with an existing information processing terminal, and thus can transmit a data signal more efficiently.

The information processing terminal 200 has been described above as an example of the second embodiment of the present invention. However, the second embodiment is not limited thereto but can be applied also to portable communication devices typified by IC cards, cell phones, and PHSs, and other various devices such as RFID tags.

(Wireless Communication Method)

A description will be made below about a wireless communication method for contactless data transmission/reception between the above-described information processing terminal 100 or 200 and the reader/writer 150.

The information processing terminal 100 or 200 generates an induced voltage Vn from a carrier generated from the reader/writer 150, to thereby receive a signal transmitted from the reader/writer 150. Electromagnetic induction Is employed for the generation of the induced voltage Vn, and a resonant circuit in the information processing terminal 100 or 200 is made to resonate at a specific frequency used as the frequency of the carrier.

The information processing terminal 100 or 200 changes the value of a load based on a response signal S1, to thereby adjust the power consumption of the load. The power consumption is so adjusted that the load value is increased to decrease the current flowing through the load when the induced voltage Vn is low, and the load value is decreased to increase the current flowing through the load when the induced voltage Vn is high.

The information processing terminal 100 or 200 carries out load modulation by enabling/disabling the load of which load value is changed based on the induced voltage Vn. The load modulation allows the information processing terminal 100 or 200 to vary the impedance seen from the reader/writer 150 to thereby transmit a signal.

This method allows the information processing terminals 100 and 200 to communicate with the reader/writer 150 in such a way that the power consumption of the load in the information processing terminals 100 and 200 is adjusted.

This method can be applied to portable communication devices typified by IC cards, cell phones, and PHSs, and other various devices such as RFID tags.

(Program)

The above-described wireless communication method can be realized by a program for causing a computer included in an information processing terminal to function as an entity that includes the following units: a unit that generates the induced voltage Vn from a carrier generated from the reader/writer 150 through electromagnetic induction, to thereby receive a signal transmitted from the reader/writer 150; a unit that changes the value of a load based on the induced voltage Vn to thereby adjust the power consumption of the load; and a unit that carries out load modulation by enabling/disabling the load of which load value is changed based on the induced voltage Vn, to thereby transmit a signal to the reader/writer 150.

Preferred embodiments of the present invention have been described above with reference to the accompanying drawings. It should be obvious that the invention is not limited to the examples in the embodiments. It is apparent that those skilled in the art may make various changes and modifications without departing from the scope and spirit of the claims set forth below, and it will be understood by those skilled in the art that these changes and modifications may also be included in the technical scope of the present invention of course.

It should be understood that those skilled in the art can easily make e.g. the following modifications and hence the modifications are included in the scope of the present invention: the load modulator 108 is provided upstream of the detection circuit 106 in FIG. 1; the clock generator 104 outputs the clock signal CLK not based on the induced voltage Vm in FIG. 1; and the information processing terminal 200 includes plural power supplies internally and/or externally in FIG. 4.

What is claimed is:

1. An information processing terminal that carries out contactless data transmission or reception with a reading or writing device by use of a magnetic field, the information processing terminal comprising:
   a data transmitter or receiver configured to generate an induced voltage from a magnetic field generated by the reading or writing device at the time of data reception, and send a transmission signal to the reading or writing device at the time of data transmission, wherein the induced voltage is direct current voltage;
   a signal processor configured to generate a response signal based on the induced voltage; and
   a load modulator configured to control a variable resistance based on the induced voltage and carry out load modulation of the transmission signal based on the response signal and the variable resistance.

2. The information processing terminal according to claim 1, wherein the load modulator comprises:
   a resistance variable circuit configured to change a value of the variable resistance;
   a load variation level control circuit configured to generate a control signal to control the variable resistance based on the induced voltage; and
   a connection circuit that allows the load modulation based on the response signal.

3. The information processing terminal according to claim 2, wherein the connection circuit is configured to connect the resistance variable circuit to ground based on the level of the response signal.

4. The information processing terminal according to claim 2, wherein the power consumed by the resistance variable circuit is configured to be adjusted according to the induced voltage and the variable resistance.

5. The information processing terminal according to claim 1, further comprising:
   an internal power supply; and
   an internal supply voltage detector configured to detect an internal supply voltage output from the internal power supply and output an internal supply voltage signal dependent upon the internal supply voltage,
   wherein the load modulator comprises:
   a resistance variable circuit configured to change a value of the variable resistance,
   a load variation level control circuit configured to generate a control signal to control the variable resistance based on the induced voltage and the internal supply voltage signal; and a connection circuit that allows the load modulation based on the response signal.

6. The information processing terminal according to claim 1, wherein the load modulator increases the variable resistance when the induced voltage is low and decreases the variable resistance when the induced voltage is high.

7. An IC card that carries out contactless data transmission or reception with a reading or writing device by use of a magnetic field, the IC card comprising:
a data transmitter or receiver configured to generate an induced voltage from a magnetic field generated by the reading or writing device at the time of data reception, and send a transmission signal to the reading or writing device at the time of data transmission, wherein the induced voltage is direct current voltage;
a signal processor configured to generate a response signal based on the induced voltage; and
a load modulator configured to control a variable resistance based on the induced voltage and carry out load modulation of the transmission signal based on the response signal and the variable resistance.

8. The IC card according to claim 7, further comprising:
an internal power supply; and
an internal supply voltage detector configured to detect an internal supply voltage output from the internal power supply and output an internal supply voltage signal dependent upon the internal supply voltage, wherein
the load modulator comprises:
a resistance variable circuit configured to change a value of the variable resistance;
a load variation level control circuit configured to generate a control signal to control the variable resistance based on the induced voltage and the internal supply voltage signal; and
a connection circuit that allows the load modulation based on the response signal.

9. The IC card according to claim 8, wherein the connection circuit is configured to connect the resistance variable circuit to ground based on the level of the response signal.

10. The IC card according to claim 8, wherein the power consumed by the power resistance variable circuit is configured to be adjusted according to the induced voltage and the variable resistance.

11. The IC card according to claim 7, wherein the load modulator increases the variable resistance when the induced voltage is low and decreases the variable resistance when the induced voltage is high.

12. A portable communication device that carries out contactless data transmission or reception with a reading or writing device by use of a magnetic field, the portable communication device comprising:
a data transmitter or receiver configured to generate an induced voltage from a magnetic field generated by the reading or writing device at the time of data reception, and send a transmission signal to the reading or writing device at the time of data transmission, wherein the induced voltage is direct current voltage;
a signal processor configured to generate a response signal based on the induced voltage; and
a load modulator configured to control a variable resistance based on the induced voltage and carry out load modulation of the transmission signal based on the response signal and the variable resistance.

13. The portable communication device according to claim 12, further comprising:
an internal power supply; and
an internal supply voltage detector configured to detect an internal supply voltage output from the internal power supply and output an internal supply voltage signal dependent upon the internal supply voltage, wherein
the load modulator comprises:
a resistance variable circuit configured to change a value of the variable resistance;
a load variation level control circuit configured to generate a control signal to control the variable resistance based on the induced voltage and the internal supply voltage signal; and
a connection circuit that allows the load modulation based on the response signal.

14. The portable communication device according to claim 13, wherein the connection circuit is configured to connect the power resistance variable circuit to ground based on the level of the response signal.

15. The portable communication device according to claim 13, wherein the power consumed by the resistance variable circuit is configured to be adjusted according to the induced voltage and the variable resistance.

16. The portable communication device according to claim 12, wherein the load modulator increases the variable resistance when the induced voltage is low and decreases the variable resistance when the induced voltage is high.

17. A wireless communication method for contactless data transmission or reception with a reading or writing device by use of a magnetic field, the method comprising the steps of:
generating an induced voltage from a magnetic field generated by the reading or writing device, wherein the induced voltage is direct current voltage;
changing a value of a variable resistance based on the induced voltage; and
carrying out load modulation based on the response signal and the variable resistance.

18. The wireless communication method according to claim 17, wherein changing a value of a variable resistance includes increasing the value of the variable resistance when the induced voltage is low and decreasing the value of the variable resistance when the induced voltage is high.

19. A computer-readable medium comprising instructions executable by a computer processor to implement a method for contactless data transmission or reception with a reading or writing device by use of a magnetic field, the method comprising:
generating an induced voltage from a magnetic field generated by the reading or writing device, wherein the induced voltage is direct current voltage;
changing a value of a variable resistance based on the induced voltage; and
carrying out load modulation based on the response signal and the variable resistance.

20. The computer-readable medium according to claim 19, wherein changing a value of a variable resistance includes increasing the value of the variable resistance when the induced voltage is low and decreasing the value of the variable resistance when the induced voltage is high.

* * * * *